United States Patent Office 2,905,632
Patented Sept. 22, 1959

2,905,632

PREPARATION OF ATTRITION RESISTANT ALUMINA FOR USE AS A CATALYST SUPPORT IN A HYDROCARBON CONVERSION PROCESS

Elroy Merle Gladrow, Baton Rouge, and Charles Newton Kimberlin, Jr., East Baton Rouge, La., assignors to Esso Research and Engineering Company, a corporation of Delaware No Drawing. Application December 1, 1954
Serial No. 472,514

20 Claims. (Cl. 208—136)

The present invention pertains to catalysts and particularly to catalyst supports or bases consisting essentially of alumina which are resistant to attrition and therefore useful for the preparation of catalysts for use in fluid operations.

It has been known for some time that catalysts that are especially useful for the hydroforming of hydrocarbon fractions boiling in the motor gasoline or naphtha range can be prepared by depositing the active catalytic component, such as molybdenum oxide, chromium oxide, as well as platinum group metals, particularly platinum itself, upon a support or base consisting essentially of aluminum oxide.

It is also well known in several catalytic hydrocarbon conversions that catalysts having the same chemical composition but prepared in different ways may differ widely in their ability to promote or catalyze a certain reaction or hydrocarbon conversion. Previous experience with hydroforming catalysts has shown that the catalyst base or support exerts a strong influence upon the ultimate behavior or activity of the catalyst and that the method of preparing the base or support has a very important bearing upon the properties of the catalyst.

It has recently been found that eta alumina of high purity when composited with platinum produces a reforming catalyst of outstanding activity. The eta alumina, of the desirable or necessary high purity, can be prepared by careful calcination of beta alumina trihydrate. Beta alumina trihydrate can be prepared in 100% purity from aluminum alcoholate, for example, by hydrolyzing the alcoholate in water at room temperature and allowing the resultant slurry to age at room temperature for more than about 40 hours. The aging time to effect complete conversion to beta alumina trihydrate can be shortened somewhat by hydrolyzing the alcoholate with aqueous ammonia solutions. The aged slurry may then be oven dried at about 210°–260° F. and the beta alumina trihydrate may then be converted to pure eta alumina by heating or calcining at about 900°–1300° F. for periods of about one to six hours.

High purity eta alumina is also derived from alcoholate alumina hydrosol. The hydrosol is prepared by hydrolyzing aluminum alcoholate in dilute acetic acid (0.5–5.0% based on $Al_2O_3$). The residual alcohol is removed by blowing the hydrosol with steam. Oven drying, or spray drying the hydrosol at temperatures of about 212°–280° F. yields essentially pure alpha alumina monohydrate. Calcining the alpha monohydrate at temperatures of about 900°–1300° F. for periods of 1–6 hours yields essentially pure eta alumina. However, experience has shown that higher activity and slightly better yields are obtained in a hydroforming operation employing a platinum on alumina catalyst when the eta alumina base is derived from the beta trihydrate as compared to the alpha monohydrate.

The eta alumina obtained from beta trihydrate is an excellent base material for platinum catalysts since such catalysts have been found to be both highly active and selective when used in the hydroforming of motor gasoline or naphtha fractions. However, such catalysts lack one very important property. The eta alumina supports prepared from beta trihydrate as described above are extremely soft and fragile and are reduced to fines in a very short time. This lack of mechanical strength is a serious drawback in a commercial catalytic operation, since it leads to excessive catalyst losses and difficulties in maintaining flow through reactor beds.

The object of this invention is to prepare an attrition resistant eta alumina derived by calcining a hydrated alumina comprising greater than about 40% beta trihydrate.

It is also the object of this invention to prepare attrition resistant eta alumina micro- and macrospheres.

It is a further object of this invention to prepare eta alumina catalyst supports of satisfactory resistance to attrition without impairing the activity or selectivity of platinum-containing hydroforming catalysts prepared therefrom.

These and other objects will appear more clearly from the detailed specification and claims which follow.

Briefly, the present invention comprises preparing beta alumina trihydrate by hydrolysis of aluminum alcoholate and aging the resultant slurry. The beta alumina trihydrate with or without drying is made into a slurry with an alumina hydrosol. This slurry is then spray dried to form microspheres containing the highly desirable beta alumina trihydrate. Calcining the microspheres at about 900°–1300° F. for one to six hours yields essentially pure eta alumina microspheres which are resistant to attrition and which, when composited with platinum, yield catalysts which have high activity and selectivity in hydroforming.

The starting material for the catalyst supports of the present invention is aluminum alcoholate. This is preferably obtained by the procedure of U. S. Patent No. 2,636,865, for example, by dissolving aluminum metal in the form of cubes of about one inch size in a mixture of equal parts by volume of mixed amyl alcohols and petroleum naphtha boiling in the range of about 220°–350° F. About one liter of alcohol-naphtha mixture is used for each 54 grams of aluminum metal. About 0.001 part by weight of mercuric chloride per part by weight of aluminum metal was added to catalyze the reaction between the aluminum metal and the alcohol. To initiate reaction between the aluminum metal and the alcohol the mixture was heated to about 220°–230° F. but after the reaction had started it was necessary to cool the mixture to control the reaction. While amyl or mixed amyl alcohols are preferred, the aluminum alcoholate can be prepared with any alcohol or mixture of alcohols which is liquid at reaction temperatures and contains up to about eight carbon atoms per molecule. The water-insoluble alcohols are preferred, since they may be more readily recovered in anhydrous form for re-use in the process.

The resulting solution of aluminum alcoholate is hydrolyzed in about 1–8 volumes of water per volume of alcoholate solution at room temperature. The aqueous slurry of hydrous alumina is separated from the regenerated alcohol and the naphtha and is allowed to age at room temperature for about 40 hours or more. If desired, about 0.5–10% of ammonia may be added to the water used for hydrolysis in order to accelerate the formation of beta alumina trihydrate. In either case, the alumina slurry is aged until the alumina is substantially completely converted to beta alumina trihydrate.

The beta alumina trihydrate is then mixed with an alumina hydrosol. The alumina hydrosol may be Patrick sol (U.S. Patent No. 2,258,099), or preferably it is made by hydrolyzing aluminum alcoholate prepared as described above, with water containing 0.5 to 5.0 percent acetic acid based on $Al_2O_3$ at temperatures of about 70°–212° F. The alumina sol should contain about 2 to 6 weight percent solids.

The mixing of the beta alumina trihydrate with the alumina hydrosol can be effected in a number of different ways. The simplest way is to mix the slurry of beta alumina trihydrate with the alumina hydrosol. If desired, or if necessary to keep the solids content in the proper range, the slurry may be thickened by partial filtration or centrifuging or the beta alumina trihydrate may be separated from the slurry and oven dried. However, when oven dried, some difficulty may be encountered in rewetting the same with the alumina hydrosol.

The amount of alumina as beta alumina trihydrate admixed with the alumina as alumina hydrosol may range from about 40% to 90%, preferably about 50–75% of the total alumina in the mixture.

The solids content of the beta alumina trihydrate slurry and/or of the alumina hydrosol should be so controlled that the composite slurry produced will have a solids content in the range of from about 3 to 10 weight percent. The composite slurry of this solids content is then subjected to spray drying in any conventional spray drier such as the Zizinia Spray Dryer obtainable from The Hull Company Division of Foster D. Snell Research, Inc. The spray dried product which consists principally of microspheres of about 20 to 80 microns diameter is then calcined at temperatures of about 900°–1300° F. for from about 1 to 6 hours to convert the alumina hydrates therein to the eta phase. The calcined product is resistant to attrition, sufficiently so that catalysts prepared therefrom may be used in fluid catalytic processes.

If desired, small amounts of silica sol, zirconia, potassia, magnesia, and/or calcium oxide may be added to the composite to give stabilizing and promoter properties to the alumina product.

The resultant alumina product is useful as a support for catalytic components such as molybdenum oxide, chromium oxide, cobalt molybdate, nickel-tungsten sulfide, and the like, and especially for platinum and other platinum group metals. The catalytic components may be incorporated in any conventional way. Highly active and selective hydroforming catalysts can, for example, be prepared by impregnating the alumina with a solution of chloroplatinic acid, drying and calcining. The amount of catalytic component added varies widely. For example, 5 to 15 weight percent molybdic oxide or 10 to 40 weight percent of chromic oxide can be incorporated to advantage. In the case of platinum group metals, the amount of the catalytic metal is much smaller and may vary from about 0.01 to 1.0% or more of platinum or from 0.05 to 5.0% of palladium.

The following examples are illustrative of the present invention.

Example I

Fifty-four pounds of aluminum metal in the form of turnings are dissolved in about 124 gallons of a 50/50 mixture of mixed amyl alcohols and petroleum naphtha boiling in the range of 200°–300° F. About 1/10 ounce of mercuric chloride is used as a catalyst for the reaction between aluminum and the amyl alcohol. It is necessary to heat the mixture to start the reaction between the metal and the alcohol, but after the reaction is started, cooling is necessary. After the reaction is complete, the solution of aluminum amylate is hydrolyzed by adding the aluminum amylate solution to 396 gallons of water at a temperature of about 65° F. Rapid agitation is used during the hydrolysis step by inserting an electrically driven stirrer (1725 r.p.m.) having two three-bladed propellers (4.5 inch diameter) connected to a single shaft into the liquids. The hydrolyzed mixture is allowed to settle into an upper layer of regenerated amyl alcohol and petroleum naphtha and a lower layer of aqueous alumina slurry. The latter is withdrawn and left at room temperature for about 120 hours.

A small portion of the aged slurry was oven dried at 250° F. X-ray analysis of this material showed 100% beta alumina trihydrate.

Example II

Fifty-five gallons of the alumina trihydrate slurry prepared as described in Example I were spray dried. X-ray analysis of the spray dried product showed 100% beta alumina trihydrate. Calcining the material for six hours at 1200° F. yielded eta alumina. The calcined product is designated "A" in the comparison to be made later.

Example III

An alumina hydrosol is prepared by the alcoholate method as follows. A solution of aluminum amylate is prepared by reacting aluminum turnings with amyl alcohol in the same proportions as described in Example I. The solution of aluminum amylate is hydrolyzed in a solution comprising four gallons of acetic acid and 396 gallons of water at a temperature of about 80° F. The mixture is allowed to separate into layers and the aqueous layer of alumina hydrosol is withdrawn. Residual alcohol and hydrocarbon is removed from the hydrosol by stripping with steam. The resulting alumina hydrosol comprises 3.15% $Al_2O_3$.

A portion of the alumina hydrosol was dried in an oven at about 250° F. X-ray examination of the dried product showed greater than 95% alpha alumina monohydrate and less than 5% beta alumina trihydrate.

Example IV

Fifty-five gallons of the alumina sol prepared as described in Example III were spray dried. X-ray analysis of the spray dried product showed about 95% alpha monohydrate and about 5% beta trihydrate. Calcining the material for six hours at 1200° F. yielded eta alumina. The calcined product is designated "B" in the comparison to be made later.

Example V

Ninety-two gallons of alumina hydrosol (3.15% solids) prepared as described in Example III were placed in a large mixing vessel and stirred. To this were added 50 gallons of the beta alumina trihydrate slurry (5.78% solids) prepared as described in Example I. The rate of addition was about 5 gallons per minute. The product derived by drying this mixture should theoretically be 55% beta trihydrate and 45% alpha monohydrate. The mixture was spray dried. X-ray examination of the spray dried product showed about 50% beta trihydrate and 50% alpha monohydrate. Thus it is seen that there was very little change in the hydrated forms on mixing their respective slurries. Calcining the material for 6 hours at 1200° F. yielded eta alumina. The calcined product is designated "C" in the comparison to be made later.

Example VI

Fifty gallons of the slurry of beta alumina trihydrate (5.78% solids) prepared as described in Example I were placed in shallow trays and oven dried at 250° F. for 16 hours. The tray dried product was broken up and made to pass through a 200 mesh sieve. The finely divided alumina trihydrate is again passed through a 200 mesh sieve and allowed to settle into a vessel containing 92 gallons of alumina hydrosol prepared as described in Example III. The alumina hydrosol (3.15% solids) is rapidly stirred with an electrically driven propeller as noted above such that the finely divided alumina trihydrate powder is rapidly imbibed into the sol and not allowed to agglomerate on the surface of the alumina sol. Theoretical composition of the total solids in the mixture is 55% beta trihydrate and 45% alpha monohydrate. After stirring for an additional 30 minutes, the mixture was spray dried. X-ray examination of the spray dried product showed about 75% beta trihydrate and 25% alpha monohydrate. Calcining the material for 6 hours at 1200° F. yielded eta alumina. The calcined product is designated "D" in the comparison to follow.

*Example VII*

Samples of products "A," "B," "C," and "D" after calcining 6 hours at 1200° F. were examined to determine their resistance to attrition. A standard attrition rate test has been set up so that direct comparisons of attrition rates can be made between different materials. The standard attrition rate is a measure of the tendency of the particles of a fluidized solids system to disintegrate into smaller particles in use. A low attrition rate is desirable for a catalyst for use in a fluidized system. The apparatus for measuring the standard attrition rate comprises essentially a settling chamber consisting of a vertical cylinder with conical ends opening at the top into a dust collecting filter and having a 0.07 inch diameter jet mounted at the bottom for the introduction of air. The cylindrical section has a diameter of 9 inches and a length of 6¾ inches; the upper conical section has a length of 6¾ inches; the lower conical section has a length of 16¼ inches. A 15 gram sample of the fluidizable solid to be tested is placed in the apparatus and subjected to a jet of air using a flow rate of 21 liters of air per minute for 5 hours. The fines produced are collected in the dust collecting filter and weighed at hourly intervals. The standard attrition rate is the average hourly rate of fines collection during hours 2 to 5 expressed as weight percent of the original sample charge. The following tabulation lists the hydrate composition of the spray dried products and the crystal form and standard attrition rates of the calcined materials.

| Product | Spray dried | | Heated 6 hrs. at 1,200° F. | |
|---|---|---|---|---|
| | Percent $Al_2O_3 \cdot 3H_2O$ | Percent $Al_2O_3 \cdot H_2O$ | Att. rate, percent/hr. | Crystal form |
| A | 100 | 0 | >60 | Eta. |
| B | <5 | >95 | 5.9 | Eta. |
| C | 50 | 50 | 6.3 | Eta. |
| D | 75 | 25 | 8.4 | Eta. |

These data show that pure eta alumina derived from hydrous alumina slurries containing a high percentage of the beta trihydrate form can be made attrition resistant by slurrying with an alumina hydrosol, drying and calcining in accordance with the present invention.

The foregoing description contains a limited number of embodiments of the present invention. It will be understood that this invention is not limited thereto, since numerous variations are possible without departing from the scope of this invention.

What is claimed is:

1. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol to form a composite containing 3 to 10 weight percent of solids, drying said composite slurry, and calcining the dried product to convert the alumina hydrates to the eta alumina phase.

2. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol to form a composite containing 3 to 10 weight percent of solids, spray drying said composite slurry to form spherical particles and calcining the spray dried particles to convert the alumina hydrates to the eta alumina phase.

3. A method of preparing catalyst supports of improved resistance to attrition which comprises hydrolyzing an aluminum alcoholate, aging the resultant water slurry to convert the hydrous alumina to beta alumina trihydate, mixing the beta alumina trihydrate with an alumina hydrosol to form a composite containing greater than 40% beta trihydrate and 3 to 10 weight percent of solids, drying said composite slurry, and calcining the dried product to convert the alumina hydrates to the eta alumina phase.

4. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol to form a composite containing greater than 40% beta trihydrate and 3 to 10 weight percent of solids, spray drying said composite slurry to form spherical particles and calcining the spray dried particles to convert the alumina hydrates to the eta alumina phase.

5. A method of preparing catalyst supports of improved resistance to attrition which comprises hydrolyzing an aluminum alcoholate with from 1 to 8 volumes of water per volume of alcoholate, said water containing about 0.5 to 10% of ammonia, aging the resultant water slurry to convert the hydrous alumina to beta alumina trihydrate, mixing the beta alumina trihydrate with an alumina hydrosol to form a composite containing greater than 40% beta trihydrate and 3 to 10 weight percent of solids, drying said composite slurry, and calcining the dried product to convert the alumina hydrates to the eta alumina phase.

6. A method of preparing catalyst supports of improved resistance to attrition which comprises hydrolyzing an aluminum alcoholate with from 1 to 8 volumes of water per volume of alcoholate, said water containing about 0.5 to 10% of ammonia, aging the resultant water slurry to convert the hydrous alumina to beta alumina trihydrate, mixing the beta alumina trihydrate with an alumina hydrosol to form a composite containing greater than 40% beta trihydrate and 3 to 10 weight percent of solids, spray drying said composite slurry to form spherical particles and calcining the spray dried particles to convert the alumina hydrates to the eta alumina phase.

7. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol derived from an aluminum alcoholate to form a composite containing 3 to 10 weight percent of solids, drying said composite slurry, and calcining the dried product to convert the alumina hydrates to the eta alumina phase.

8. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol derived from an aluminum alcoholate to form a composite containing 3 to 10 weight percent of solids, spray drying said composite slurry to form spherical particles and calcining the spray dried particles to convert the alumina hydrates to the eta alumina phase.

9. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol derived from an aluminum alcoholate to form a composite containing greater than 40% beta trihydrate and 3 to 10 weight percent of solids, drying said composite slurry, and calcining the dried product to convert the alumina hydrates to the eta alumina phase.

10. A method of preparing catalyst supports of improved resistance to attrition which comprises hydrolyzing an aluminum alcoholate, aging the resultant water slurry to convert the hydrous alumina to beta alumina trihydrate, mixing the beta alumina trihydrate with an alumina hydrosol derived from an aluminum alcoholate to form a composite containing greater than 40% beta trihydrate and 3 to 10 weight percent of solids, spray drying said composite slurry to form spherical particles and calcining the spray dried particles to convert the alumina hydrates to the eta alumina phase.

11. A method of preparing catalyst supports of improved resistance to attrition which comprises hydrolyzing an aluminum alcoholate with from 1 to 8 volumes of water per volume of alcoholate, said water containing about 0.5 to 10% of ammonia, aging the resultant water slurry to convert the hydrous alumina to beta alumina trihydrate, mixing the beta alumina trihydrate with an alumina hydrosol derived from an aluminum alcoholate to form a composite containing greater than 40% beta trihydrate and 3 to 10 weight percent of solids, drying said composite slurry, and calcining the dried product to convert the alumina hydrates to the eta alumina phase.

12. A method of preparing catalyst supports of improved resistance to attrition which comprises hydrolyzing an aluminum alcoholate with from 1 to 8 volumes of water per volume of alcoholate, said water containing about 0.5 to 10% of ammonia, aging the resultant water slurry to convert the hydrous alumina to beta alumina trihydrate, mixing the beta alumina trihydrate with an alumina hydrosol derived from an aluminum alcoholate to form a composite containing greater than 40% beta trihydrate and 3 to 10 weight percent of solids, spray drying said composite slurry to form spherical particles and calcining the spray dried particles to convert the alumina hydrates to the eta alumina phase.

13. Attrition resistant particles consisting essentially of eta alumina formed by slurring beta alumina trihydrate derived from the hydrolysis of aluminum alcoholate with an alumina hydrosol, drying the composite slurry and calcining the dried product.

14. Attrition resistant particles consisting essentially of eta alumina formed by slurrying beta alumina trihydrate derived from the hydrolysis of aluminum alcoholate with an alumina hydrosol derived from an aluminum alcoholate, drying the composite slurry and calcining the dried product.

15. Attrition resistant catalysts consisting essentially of a hydrogenation catalyst component dispersed upon eta alumina formed by slurrying beta alumina trihydrate derived from the hydrolysis of aluminum alcoholate with an alumina hydrosol, drying the composite slurry and calcining the dried product.

16. Attrition resistant catalysts consisting essentially of a hydrogenation catalyst component dispersed upon eta alumina formed by slurrying beta alumina trihydrate derived from the hydrolysis of aluminum alcoholate with an alumina hydrosol derived from an aluminum alcoholate, drying the composite slurry and calcining the dried product.

17. A process of converting hydrocarbons which comprises contacting the hydrocarbon in admixture with hydrogen under active conversion conditions with attrition resistant catalysts consisting essentially of a hydrogenation catalyst component dispersed upon eta alumina formed by slurrying beta alumina trihydrate derived from the hydrolysis of aluminum alcoholate with an alumina hydrosol, drying the composite slurry and calcining the dried product.

18. A process of converting hydrocarbons which comprises contacting the hydrocarbon in admixture with hydrogen under active conversion conditions with attrition resistant catalysts consisting essentially of a hydrogenation catalyst component dispersed upon eta alumina formed by slurrying beta alumina trihydrate derived from the hydrolysis of aluminum alcoholate with an alumina hydrosol derived from an aluminum alcoholate, drying the composite slurry and calcining the dried product.

19. A process of converting hydrocarbons which comprises contacting the hydrocarbons in admixture with hydrogen with a dense fluidized bed of attrition resistant catalyst particles consisting essentially of a hydrogenation catalyst component dispersed upon eta alumina formed by slurrying beta alumina trihydrate derived from the hydrolysis of aluminum alcoholate with an alumina hydrosol, drying the composite slurry and calcining the dried product and maintained under active conversion conditions.

20. A process of converting hydrocarbons which comprises contacting the hydrocarbons in admixture with hydrogen with a dense fluidized bed of attrition resistant catalyst particles consisting essentially of a hydrogenation catalyst component dispersed upon eta alumina formed by slurrying beta alumina trihydrate derived from the hydrolysis of aluminum alcoholate with an alumina hydrosol derived from an aluminum alcoholate, drying the composite slurry and calcining the dried product and maintained under active conversion conditions.

References Cited in the file of this patent

UNITED STATES PATENTS

| 2,422,172 | Smith et al. | June 10, 1947 |
| 2,636,865 | Kimberlin | Apr. 28, 1953 |
| 2,656,321 | Hunter et al. | Oct. 20, 1953 |
| 2,734,022 | Kimberlin et al. | Feb. 7, 1956 |
| 2,796,326 | Kimberlin et al. | June 18, 1957 |

FOREIGN PATENTS

| 503,104 | Belgium | Aug. 29, 1952 |

OTHER REFERENCES

Stumpf et al.: Ind. and Eng. Chem., vol. 42 (1950), pages 1398–1403.